(12) United States Patent
Merritt

(10) Patent No.: US 9,084,506 B2
(45) Date of Patent: Jul. 21, 2015

(54) GRILL SMOKER DEVICE

(76) Inventor: Matthew H. Merritt, Ponte Vedra Beach, FL (US)

( * ) Notice: Subject to any disclaimer, the term of this patent is extended or adjusted under 35 U.S.C. 154(b) by 0 days.

(21) Appl. No.: 13/442,030

(22) Filed: Apr. 9, 2012

(65) Prior Publication Data
US 2012/0255538 A1   Oct. 11, 2012

Related U.S. Application Data

(60) Provisional application No. 61/516,968, filed on Apr. 11, 2011.

(51) Int. Cl.
*A47J 37/00* (2006.01)
*A47J 37/06* (2006.01)
*A47J 37/07* (2006.01)
*A23B 4/044* (2006.01)

(52) U.S. Cl.
CPC .............. *A47J 37/06* (2013.01); *A47J 37/0786* (2013.01); *A23B 4/044* (2013.01)

(58) Field of Classification Search
CPC ................................ A23B 4/044; A23B 4/052
USPC .................. 126/25 R, 369; 99/482, 417, 413
See application file for complete search history.

(56) References Cited

U.S. PATENT DOCUMENTS

| | | | |
|---|---|---|---|
| 2,967,023 A | 1/1961 | Huckabee | |
| 3,299,800 A | 1/1967 | Angelo | |
| 3,333,526 A | 8/1967 | Kirkpatrick | |
| 3,776,127 A * | 12/1973 | Muse | 99/482 |
| 4,094,295 A | 6/1978 | Boswell et al. | |
| 4,140,049 A | 2/1979 | Stewart | |
| 4,300,444 A | 11/1981 | Muse | |
| 4,554,864 A | 11/1985 | Smith et al. | |
| 4,869,163 A | 9/1989 | Haskins | |
| 5,167,183 A | 12/1992 | Schlosser et al. | |
| 5,191,831 A * | 3/1993 | Walden | 99/446 |
| 5,584,235 A | 12/1996 | DuBois et al. | |
| 5,768,977 A * | 6/1998 | Parris et al. | 99/340 |
| 5,891,498 A | 4/1999 | Boehler | |
| 5,988,157 A * | 11/1999 | Brown et al. | 126/110 R |
| 6,016,797 A | 1/2000 | Nowicke, Jr. | |
| 6,059,849 A | 5/2000 | Lewis | |
| 6,481,344 B1 | 11/2002 | Green et al. | |
| 6,701,829 B2 | 3/2004 | Farrow | |
| 7,331,278 B2 | 2/2008 | Stokes, Jr. | |
| 7,703,386 B1 * | 4/2010 | Bourgeois et al. | 99/340 |
| 7,832,330 B1 | 11/2010 | Thompson | |
| 8,304,697 B2 * | 11/2012 | McGhee et al. | 219/409 |
| 2010/0269713 A1 * | 10/2010 | Foster | 99/482 |

* cited by examiner

*Primary Examiner* — Kenneth Rinehart
*Assistant Examiner* — Gajanan M Prabhu
(74) *Attorney, Agent, or Firm* — Smith Risley Tempel Santos LLC; Steven P. Wigmore

(57) ABSTRACT

A grill smoker device having an upper receptacle member adapted to receive liquid and a lower receptacle member adapted to receive wood chips, the upper and lower receptacle members being releasably connected to each other. A plurality of suspension arms extend laterally from the upper or lower receptacle members such that the device is positionable in a grill beneath the grill grid and above the heat source.

10 Claims, 2 Drawing Sheets

US 9,084,506 B2

GRILL SMOKER DEVICE

This application claims the benefit of U.S. Provisional Patent Application Ser. No. 61/516,968, filed Apr. 11, 2011, the disclosure of which is incorporated herein by reference.

BACKGROUND OF THE INVENTION

This invention relates generally to the field of outdoor cooking grills of the type utilizing gas, charcoal or wood to cook meat or other foods for consumption, and more particularly relates to grills designed to produce smoke from wood chips or similar material during the cooking process, as well as to adaptors or accessories which can be used with a grill to produce smoke from wood chips or similar material during the cooking process.

Typical outdoor grills for cooking meat and other food products comprise a heat source and a cooking grid for supporting the food, both contained within a housing comprising a base and a removable or hinged cover that together define a cooking chamber. The heat source is typically charcoal, wood or gas. In one style of cooking, the meat is cooked for an extended length of time at a relatively low temperature. In order to optimize the process, it is known to provide pans of water in the grill, the water evaporating to insure that the meat does not become too dry. It is also known to provide a source of flavoring smoke to enhance the final product, such as by smoldering wood chips deposited in a container, in a procedure known as smoking. Some grills are constructed with built-in components to operate as smokers. It is also known to provide smoker adaptors or accessories to be used in conjunction with a standard grill.

It is an object of this invention to provide an improved grill smoker device that is an accessory or adaptor, the grill smoker device serving to provide moisture from evaporating water and smoke from wood chips or the like, wherein the structure of the device insures that it can be easily and readily used with standard grills.

SUMMARY OF THE INVENTION

The invention is a grill smoker device that is an accessory or adaptor for a standard grill, the device comprising an upper receptacle member and a lower receptacle member, the receptacle members being connectable in a releasable manner that allows the receptacle members to be readily separated, wherein the upper receptacle member is adapted to receive and retain water or other liquids for evaporation during the cooking process and the lower receptacle member is adapted to receive and retain wood chips or similar material for smoking during the cooking process. The upper receptacle member comprises a peripheral wall and a bottom, the top being open or having openings such that the evaporating liquid passes from the upper member into the grill chamber. The lower receptacle member comprises a peripheral wall, a bottom and apertures such that the smoke created by heating the wood chips escapes from the lower receptacle member into the grill chamber. The lower receptacle member may be composed of apertured sheet metal or constructed from a screen or mesh material. A plurality of suspension arm members extend generally laterally from one of the receptacle members, the length of the arm members being sufficient that the arm members will rest on the upper edge or edges of the base or the fire ring of a grill. The arm members are structured or angled relative to the upper receptacle member such that the combined upper and lower receptacle members are positioned beneath the cooking grid that is generally centrally disposed in the grill chamber and above the heat source disposed in the bottom of the grill chamber when the upper and lower receptacle members in use within the grill chamber.

DETAILED DESCRIPTION OF THE INVENTION

Figure 1:
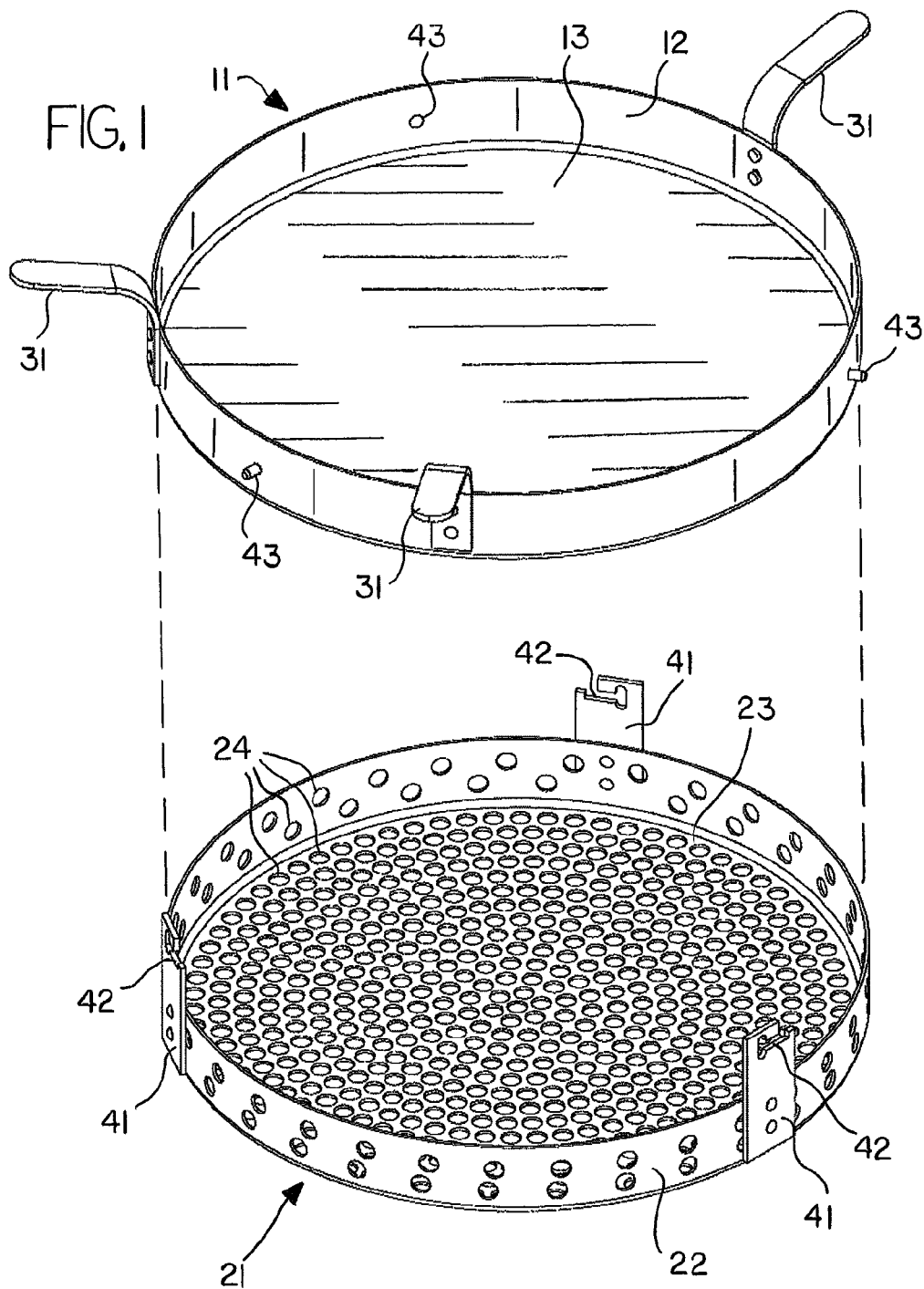
FIG. 1 is an exploded view of an embodiment of the grill smoker device.
Figure 2:
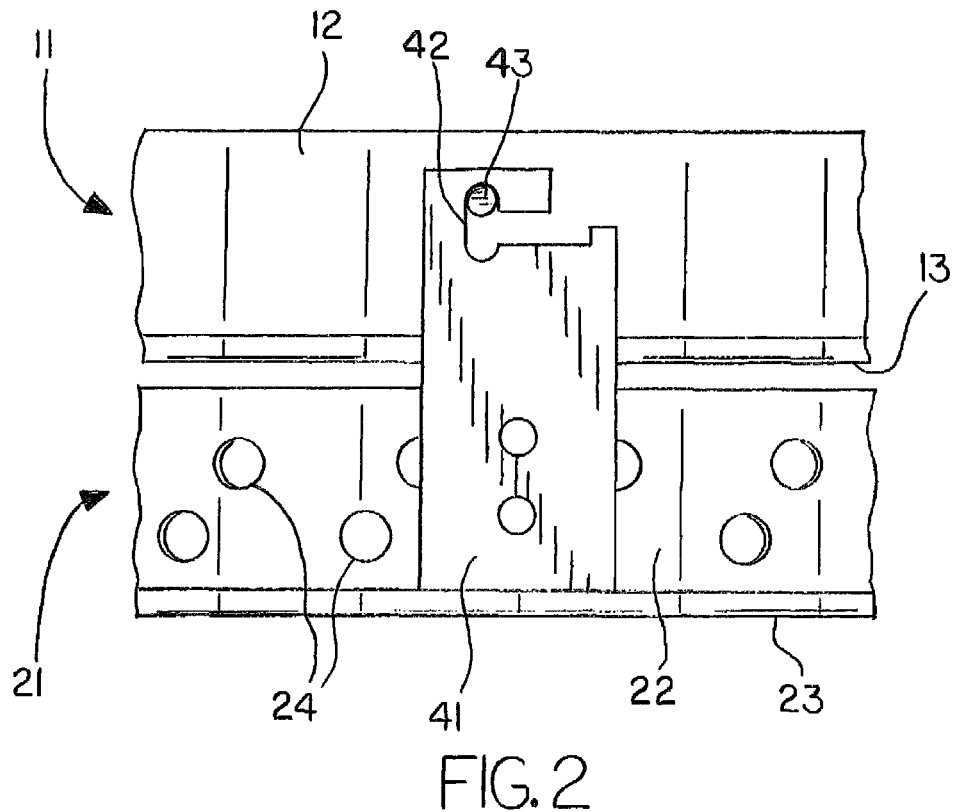
FIG. 2 is partial side view showing an embodiment of the means for releasably connecting the upper member to the lower member.

With reference to the drawings, embodiments of the invention will be described with regard for the best mode and preferred embodiment. In a general sense, the invention is an accessory for outdoor cooking grills for cooking meat and other food products, the grill being of the type comprising a heat source 54 and a cooking grid 55 for supporting the food during the cooking process, both contained within a housing comprising a base 51 and a removable or hinged cover that together define an interior grill chamber 53. The heat source 54 is typically charcoal, wood or gas. The invention is a grill smoker device that provides moisture form an upper receptacle member 11 and/or smoke from a lower receptacle member 21 within the grill chamber 53 during the cooking process, the moisture reducing the drying effects of the heat on the meat and the smoke imparting flavor to the meat. The upper and lower receptacle members 11 and 21 reside between the heat source 54 and the cooking grid 55 when in use.

As seen in the figures, the invention is a grill smoker device that is an accessory or adaptor for a standard grill, the device comprising an upper receptacle member 11 and a lower receptacle member 21, the receptacle members 11 and 21 being connectable in a releasable manner that allows the receptacle members 11 and 21 to be separated, wherein the upper receptacle member 11 is adapted to receive and retain water or other liquids and the lower receptacle member 21 is adapted to receive and retain wood chips or similar material. Connecting members 40 are provided to join the lower receptacle member 21 to the upper receptacle member 11, the connecting members 40 comprising mechanical constructs that allow the lower receptacle member 21 to be separated from the upper receptacle member 11 in order to load wood chips or the like into the lower receptacle member 21 and to remove remnants of the wood chips after the cooking process has been completed, or to allow the upper receptacle member 11 to be used alone. As shown in the drawings, an exemplary embodiment for the releasable connecting members 40 comprises a plurality of extension plate members 41 joined to the lower receptacle member 21, the extension plate members 41 being provided with slots 42 to receive post members 43 joined to the upper receptacle member 11. To connect the lower receptacle member 21 to the upper receptacle member 11, the opening of the slots 42 are aligned with the post members 41 and the one or both of the receptacle members 11 and 21 are rotated. Separation of the receptacle members 11 and 21 is accomplished by reversing the operation. Alternative cooperating structures for the connecting members 40 may be used, such as for example hook members, mating threads, etc.

The upper receptacle member 11 comprises a peripheral wall 12 and a bottom 13, the top being preferably completely open as shown in the drawings, or being formed of a substantially solid material having one or more openings such that liquid can be deposited into the upper receptacle member 11 and water vapor may escape from the upper receptacle member 11. With the upper receptacle member 11 installed within the cooking grill, the evaporating liquid passes from the upper receptacle member 11 and into the grill chamber 53 during the cooking process. Because the device is subjected to high temperatures, stainless steel or other materials having good high temperature properties may be used to form the upper and lower receptacle members 11 and 21.

The lower receptacle member 21 comprises a peripheral wall 22 and a bottom 23, preferably with apertures 24 located in either or both the wall 22 and the bottom 23, such that smoke created by heating wood chips retained therein can escape from the lower receptacle member 21 into the grill chamber 53 during the cooking process. In one embodiment, the lower receptacle member 21 may be constructed completely or partially from a heavy duty screen or mesh material. Alternatively, the peripheral wall 22 and/or the bottom 23 of the lower receptacle member 21 may be formed of a substantially solid material having apertures 24 positioned thereon. The lower receptacle member 21 may also be provided with a top (not shown), preferably apertured or composed of a screen or mesh material.

Figure 3:
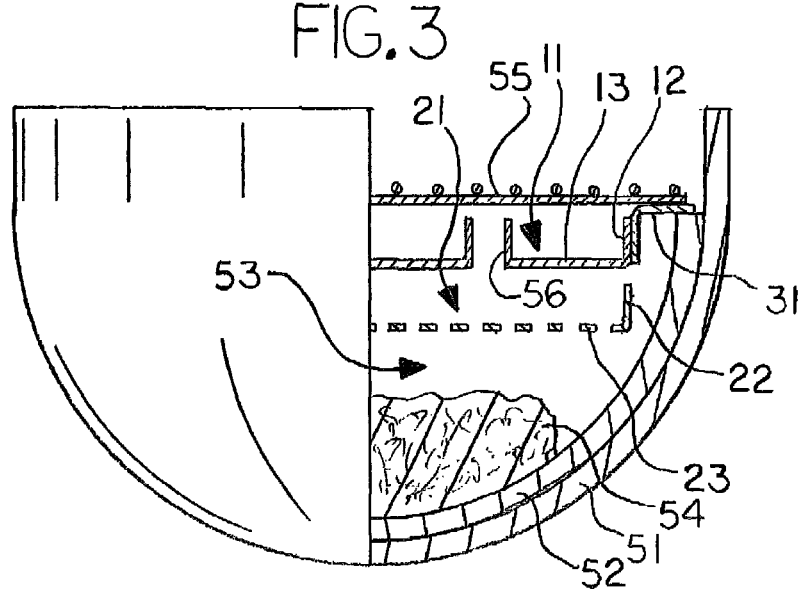
FIG. 3 is a partial cross-sectional view illustrating an embodiment of the grill smoker device positioned in the lower grill chamber of a representative cooking grill.

A plurality of suspension arm members 31 extend generally radially and laterally from either the upper receptacle member 11, as shown, or from the lower receptacle member 21, the length of the arm members 31 being sufficient such that a portion of the arm members 31 will rest on the upper edge of the grill base 51, or on the internal fire ring 52 of a grill as shown in FIG. 3, or on the internal support flanges for the cooking grid 55. A fire ring 52 is an annular member found in some circular or egg-shaped grills. The arm members 31 are designed and positioned relative to the upper receptacle member 11 such that the combined upper and lower receptacle members 11 and 21 reside suspended beneath the cooking grid 55 and above the heat source 54 when in use. The arm members 31 are preferably thin in cross-section in order to minimally interfere with the lowered cover of a grill when the arm members 31 rest on the edge of the grill base 51 rather than an internal fire ring 52. When the arm members 31 are rested on the upper edge of the grill base 51, the arm members 31 are structured to extend through the cooking grid 55.

As shown in the embodiment of the drawings, the upper and lower receptacle members 11 and 21 may have a round or annular periphery. This design is highly suitable for round or egg-shaped grills. Alternatively, the upper and lower receptacle members 11 and 21 may be square, rectangular or possess other peripheral configurations. The upper receptacle member 11 may be provided with at least one vertically oriented open tube or passageway 56 to allow smoke to pass upwardly through upper receptacle member 11 to directly impinge upon meat cooking directly above the upper receptacle member 11, as shown in FIG. 3.

It is understood that equivalents and substitutions for certain elements and structures set forth above may be obvious to those of ordinary skill in the art, and therefore the true scope and definition of the invention is to be as set forth in the following claims.

I claim:

1. A grill smoker device comprising:
   an upper receptacle member having a first shape comprising a first bottom and a peripheral wall, said upper receptacle member adapted to receive and retain a liquid therein;
   a lower receptacle member having a second shape comprising a second bottom and a peripheral wall, said lower receptacle member adapted to receive and retain wood chips therein, the lower receptacle member comprising a plurality of apertures, the first and second shapes of the upper and lower receptacles being substantially identical;
   connecting members releasably joining said lower receptacle member to said upper receptacle member, each connecting member comprising interlocking mechanisms that rotatably and slideably engage with each other, such that the lower receptacle member is directly supported by the upper receptacle member via the connecting members alone, the first bottom and second bottom each defining a geometrical plane, each geometrical plane having a perimeter which is substantially equal to the other; and
   suspension arm members extending laterally from said upper receptacle member, wherein said connecting members comprise the combination of a plurality of post members mounted onto said upper receptacle wall and a plurality of extension plate members, the extension plate members mounted onto said lower receptacle wall, said extension plate members having slots adapted to receive said post members therein, at least one slot having a vertical terminating section with a locking geometry for locking a post member within the geometry, said upper receptacle member further comprising at least one vertically oriented protruding passageway from and above the first bottom whereby smoke generated in said lower receptacle member passes through said upper receptacle member.

2. The device of claim 1, wherein said peripheral wall of said lower receptacle member is provided with apertures.

3. The device of claim 1, wherein said peripheral walls of said upper receptacle member and said lower receptacle member are annular.

4. A grill smoker device and a cooking grill in combination; said cooking grill comprising a grill base having an upper edge and a cooking grid supported within said grill base; said grill smoker device comprising an upper receptacle member having a first shape comprising a first bottom and a peripheral wall, said upper receptacle member adapted to receive and retain a liquid therein;
   a lower receptacle member having a second shape comprising a second bottom and a peripheral wall, said lower receptacle member adapted to receive and retain wood chips therein; the lower receptacle comprising a plurality of apertures, the first and second shapes of the upper and lower receptacles being substantially identical;
   connecting members releasably joining said lower receptacle member to said upper receptacle member; each connecting member comprising interlocking mechanisms that rotatably and slideably engage with each other, such that the lower receptacle member is directly supported by the upper receptacle member via the connecting members alone, the first bottom and second bottom each defining a geometrical plane, each geometrical plane having a perimeter which is substantially equal to the other; and
   suspension arm members extending laterally from either said upper receptacle member or said lower receptacle member; wherein said suspension arm members suspend said upper and lower receptacle members within said grill base beneath said cooking grid, wherein said connecting members comprise the combination of a plurality of post members mounted onto said upper receptacle wall and a plurality of extension plate members, the extension plate members mounted onto said lower receptacle wall, said extension plate members having slots adapted to receive said post members therein, at least one slot having a vertical terminating section with a vertical locking geometry for locking a post member within the geometry, said upper receptacle member further comprising at least one vertically oriented protruding passageway from and above the first bottom whereby smoke generated in said lower receptacle member passes through said upper receptacle member.

5. The combination of claim 4, wherein said cooking grill further comprises a fire ring and said suspension arm members of said grill smoker device rest upon said fire ring.

6. The combination of claim 4, wherein said lower receptacle member further comprises apertures disposed in said peripheral wall.

7. The device of claim 6, wherein said peripheral walls of said upper receptacle member and said lower receptacle member are annular.

8. The combination of claim 4, wherein said peripheral walls of said upper receptacle member and said lower receptacle member are annular.

9. The combination of claim 8, wherein said lower receptacle member further comprises apertures disposed in said peripheral wall.

10. The combination of claim 9, wherein said cooking grill further comprises a fire ring and said suspension arm members of said grill smoker device rest upon said fire ring.

\* \* \* \* \*